United States Patent [19]

Kobori et al.

[11] Patent Number: 5,028,993
[45] Date of Patent: Jul. 2, 1991

[54] VIDEO PRINTER HAVING DATA ARE STORED IN MAIN AND SUB MEMORIES ARE READ OUT IN SYNCHRONISM THEREBY GENERATING A SYNTHESIZED PICTURE DATA

[75] Inventors: Yasunori Kobori, Yokohama; Hiroyuki Kimura, Kanagawa; Kentaro Hamma, Katsuta; Toshihiko Gotoh, Tokyo, all of Japan

[73] Assignee: Hitachi, Ltd., Tokyo, Japan

[21] Appl. No.: 338,298

[22] Filed: Apr. 14, 1989

[30] Foreign Application Priority Data

Apr. 15, 1988 [JP] Japan .................................. 63-91409

[51] Int. Cl.[5] ............................................. H04N 1/46
[52] U.S. Cl. ........................................ 358/78; 358/76
[58] Field of Search .................. 358/75, 76, 78, 80, 358/183; 355/38; 382/56

[56] References Cited

U.S. PATENT DOCUMENTS

| | | | |
|---|---|---|---|
| 4,622,582 | 11/1986 | Yamada | 358/80 |
| 4,713,695 | 12/1987 | Macheboeuf | 358/183 |
| 4,750,212 | 6/1988 | Yokomizo | 358/183 |
| 4,774,582 | 9/1988 | Hakamada et al. | 358/183 |
| 4,797,712 | 1/1989 | Hayashi et al. | 355/38 |
| 4,809,069 | 2/1989 | Meyer et al. | 358/183 |
| 4,896,208 | 1/1990 | Moriya et al. | 358/78 |

Primary Examiner—James J. Groody
Assistant Examiner—Kim Yen Vu
Attorney, Agent, or Firm—Antonelli, Terry, Stout & Kraus

[57] ABSTRACT

A video printer comprises a main memory unit for storing data of a first picture, a sub-memory for storing data for an overlay region to be overlaid on the first picture and also indicative of a second picture to be displayed in the overlay region, a memory data processing unit for generating a synthesized picture by selectively controlling the picture data for the overlay region on the basis of the data stored in the sub-memory, a system control circuit for controlling the data storage in the main memory unit, the data storage in the sub-memory circuit and operation of the memory data processing circuit, and a print circuit for producing a hard copy on the basis of the output of the memory data processing circuit.

9 Claims, 14 Drawing Sheets

FIG. 11A  FIG. 11B
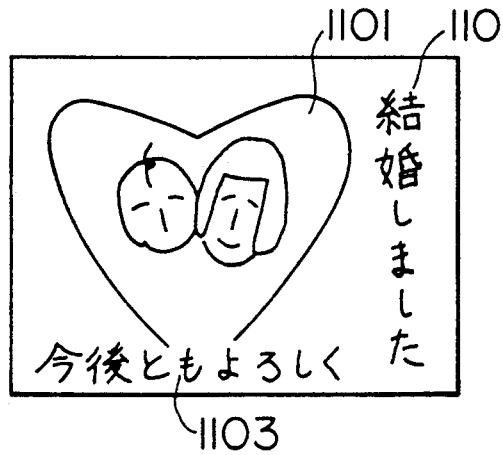
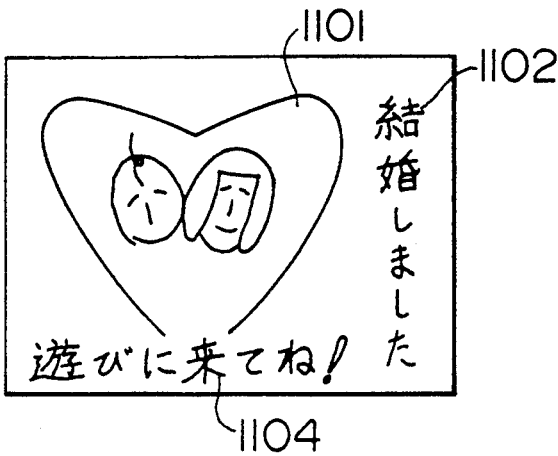
FIG. 13
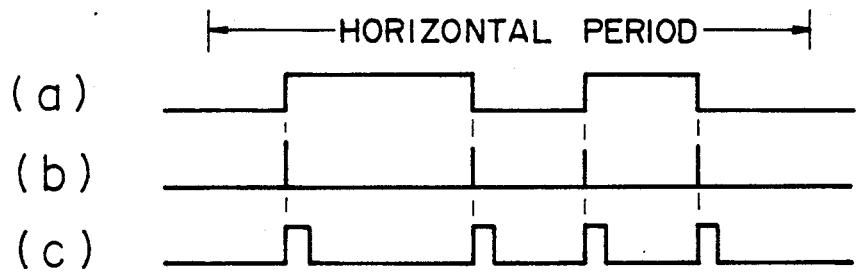
FIG. 14
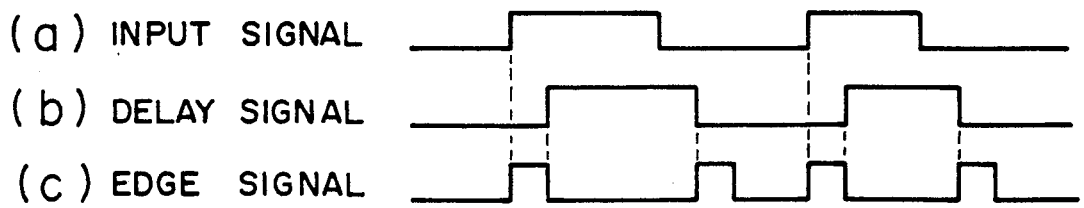

VIDEO PRINTER HAVING DATA ARE STORED IN MAIN AND SUB MEMORIES ARE READ OUT IN SYNCHRONISM THEREBY GENERATING A SYNTHESIZED PICTURE DATA

BACKGROUND OF THE INVENTION

1. Field of the Invention

The present invention generally relates to a video printer for hard-copying a video signal. More particularly, the invention is concerned with a video printer for printing out as a hard copy a memory picture stored in a memory in the form of video data while overlaying thereon image(s) of characters, graphics and/or other picture(s).

2. Description of the Related Art

The video printer known heretofore is implemented in such a structure in which a sub-memory is provided in addition to a main memory, wherein original picture data is stored in the main memory with image data for the character(s), graphic pattern(s) and/or other picture(s) to be overlaid being stored in the sub-memory, and a picture resulting from synthesization of the original picture with the image(s) to be overlaid is once again stored in the main memory and thereafter read out to be printed out as a hard copy, as is disclosed in Japanese Patent Publication No. 62-42,428 (1987). With the hitherto known structure of the video printer, the original image (picture or video) data stored initially in the main memory is erased when the synthesized video or image data is stored in the main memory. Further, it is impossible to erase or cancel the overlay image(s) from the synthesized picture once stored in the main memory.

With the prior art technique mentioned above, it is certainly possible to erase a region of the original picture to be overlaid and display the region in one color, e.g. in black. However, the prior art video printer can not realize a white/black reversal function for erasing the original picture by coloring it in black except for the region where the overlay image is to be inlaid so that the original picture may appear as the background. Further, the prior art video printer can realize neither the function of displaying the original picture in a half-tone over a region to be overlaid nor a multi-synthesizing function for synthesizing selectively a plurality of words or character strings, graphic patterns and/or others.

SUMMARY OF THE INVENTION

It is a first object of the present invention to provide a video printer capable of printing out as a hard copy for a video data by overlaying image(s) of character(s), graphic pattern(s) and/or picture(s) on an original picture stored in a main memory while avoiding erasure of the original picture stored in the main memory.

Another object of the present invention is to provide a video printer having the capability of executing the white/black reversal function, a half-tone display function and/or the multiple synthesization function.

In view of the above object, there is provided according to a first aspect of the present invention a video printer which comprises a main memory unit for storing data for a first picture, a sub-memory for storing data for a region to be overlaid on the first picture, a memory data processing unit for generating data for a synthesized image or picture by controlling selectively the data for the overlay region on the basis of the data stored in the sub-memory, a system controller for controlling storage of the data in the main memory unit, storage of data in the sub-memory and operation of the memory data processing unit, and a printer for generating a hard copy on the basis of the output of the memory data processing unit.

According to a second aspect of the present invention, there is provided a video printer in which the above-mentioned memory data processing unit is provided with a half-tone control for controlling selectively the tone of the original picture to be displayed in the overlay region on the basis of the data stored in the sub-memory.

BRIEF DESCRIPTION OF THE DRAWINGS

FIGS. 11A and 11B are views for illustrating printed images generated according to the teachings of the invention implemented in the embodiment shown in FIG. 10;

FIGS. 13 and 14 are waveform diagrams for illustrating operation of the circuit shown in FIG. 12;

DESCRIPTION OF THE PREFERRED EMBODIMENTS

Figure 1:
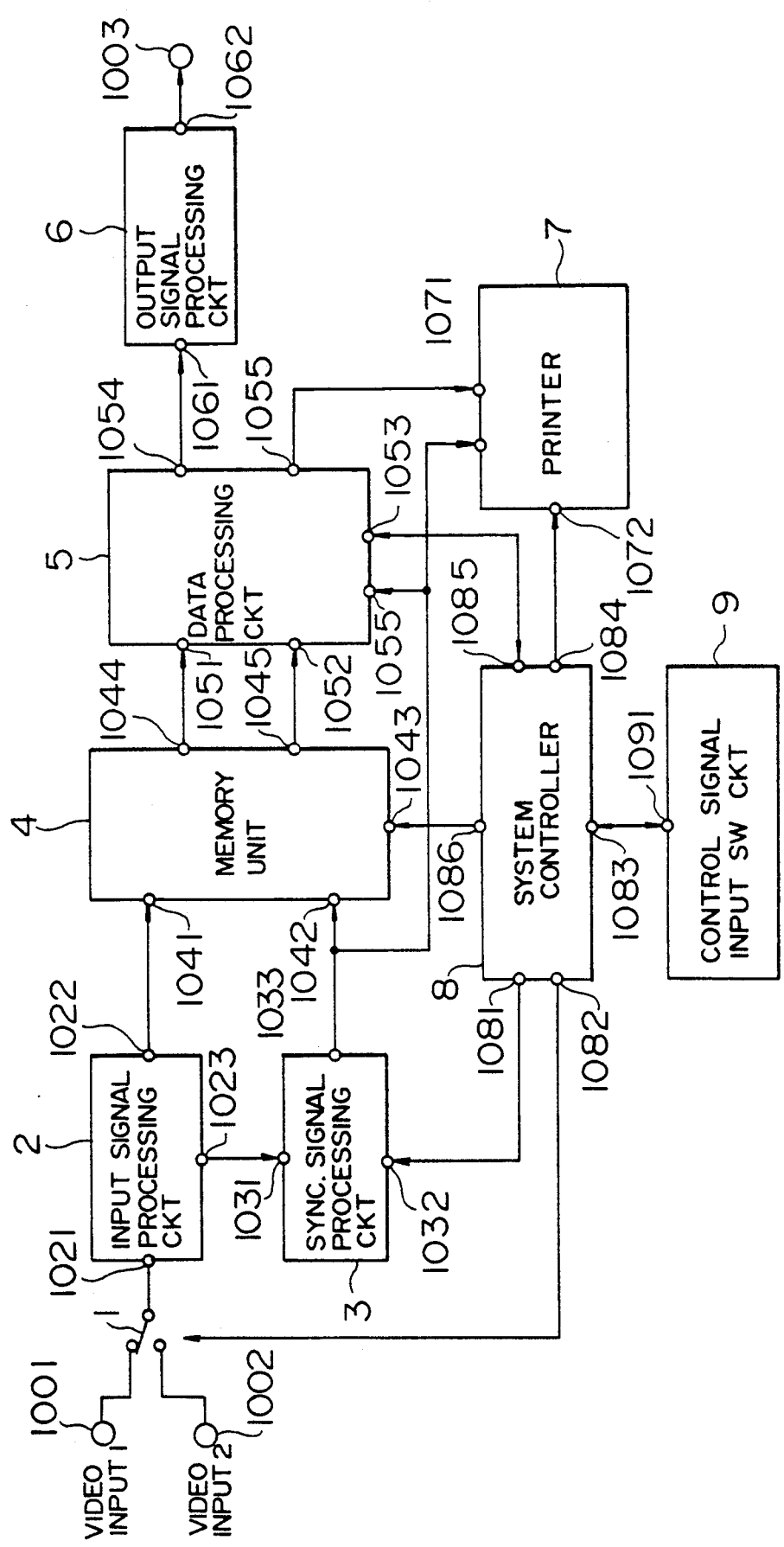
FIG. 1 is a block diagram showing a general arrangement of a video printer according to an exemplary embodiment of the present invention.

Now, the present invention will be described in detail in conjunction with an exemplary embodiment of the video printer by reference to FIG. 1 which shows a general arrangement thereof. In this figure, reference numeral 1 denotes a video input switch, 2 denotes an input signal processing circuit, 3 denotes a synchronizing signal processing circuit, 4 denotes a memory unit, 5 denotes a data processing circuit, 6 denotes an output signal processing circuit, 7 denotes a printer, 8 denotes a system controller, and numeral 9 denotes a control signal input circuit constituted by switches and others. Further, reference numerals 1001 and 1002 denote video signal input terminals and 1003 denotes a video signal output terminal array.

Figure 2:
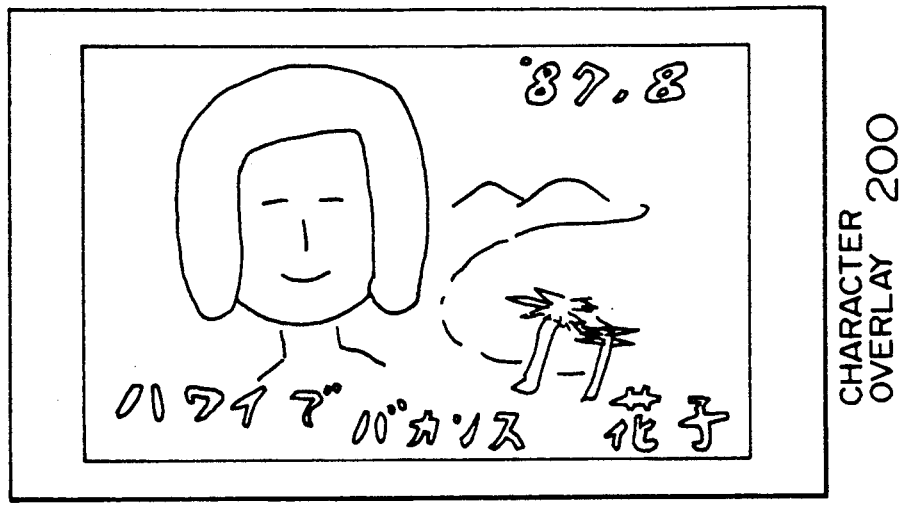
FIGS. 2, 3 and 4 are conceptual diagrams showing pictures generated and printed out according to the teachings of the present invention.

The video printer illustrated in FIG. 1 serves for synthesizing a picture and character strings 200 in such a manner as is illustrated in FIG. 2 and printing out the synthesized picture. The picture and the graphics to be overlayed thereon are stored in memories independent of each other and subsequently synthesized by virtue of an overlay function realized according to the invention.

Operation of the video printer will be elucidated below. Either picture or video signals applied to the video signal input terminals 1001 and 1002 are selected by the video input switch 1 to be supplied to the input signal processing circuit 2 of the succeeding stage. The selection of the video signals by the video input switch 1 is determined in dependence on a command signal issued by the system controller 8. In the input signal processing circuit 2, the three primary color signals (i.e. R-, G- and B-signals) or the luminance signal and the chrominance signals are processed into a picture signal which then undergoes an analogue-to-digital conversion to be converted into a digital data signal.

On the other hand, the synchronizing signal processing circuit 3 is supplied with synchronizing signals from the input signal processing circuit 2 to produce an external vertical synchronizing signal (VD), an external horizontal synchronizing signal (HD) and a clock pulse signal (CP). Alternatively, the synchronizing signal processing circuit 3 may be so implemented as to generate internally the vertical synchronizing signal (VD), the horizontal synchronizing signal (HD) and the clock pulse signal (CP) in response to a control signal issued by the system controller 8. These signals are supplied to the memory unit 4 and the printer 7 of the succeeding stages. The memory unit 4 includes main memories and a sub-memory, as will be described hereinafter in conjunction with FIG. 5, wherein the video signal is stored in the main memories while the signal to be overlaid such as a character and/or graphic data signal is held in the sub-memory separately and distinctly from the video signal in response to a freeze command issued by the system controller 8. In this conjunction, it should be mentioned that the main memories and the sub-memory are not necessarily to be independent from each other in the memory function. All the memories may also be used for storing the video signal. The data held by the main memories and the sub-memory are subsequently read out under a read (R) command issued by the system controller 8 to be supplied to the succeeding data processing circuit 5.

Figure 3:
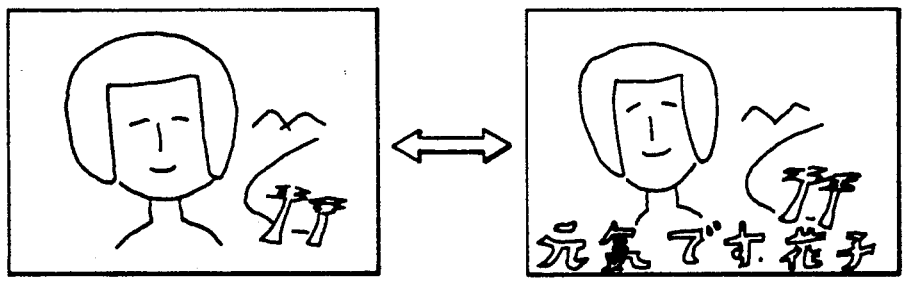
Figure 4:
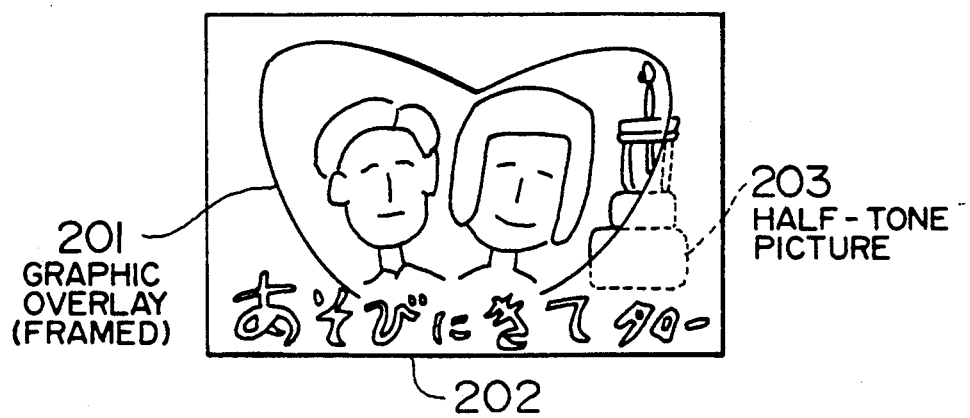

The data processing circuit 5 serves for such functions as turn-on/off of the overlay (as is illustrated in FIG. 3), designation of color for the overlay and generation of a half-tone screen effect for providing a hazy background picture 203 for the overlays 201 and 202 (as illustrated in FIG. 4) under the control of the system controller 8. Further, the data processing circuit 5 is so interlocked with the system controller 8 and the printer 7 as to inhibit the color designation and the turn-on/off of the overlay during the print operation. The output of the data processing circuit 5 is supplied to the succeeding output signal processing circuit 6 and the printer 7. The output of the output signal processing circuit 6 is an ordinary picture signal which can be displayed and confirmed on a monitor (not shown). On the other hand, the printer 7 responds to a print command issued by the system controller 8 to select one data for by one the three primary colors R, G and B supplied from the data processing circuit 5, whereby a hard copy of the picture signal printed in three colors can be obtained by repeating the printing operation for the three colors, respectively.

Figure 5:
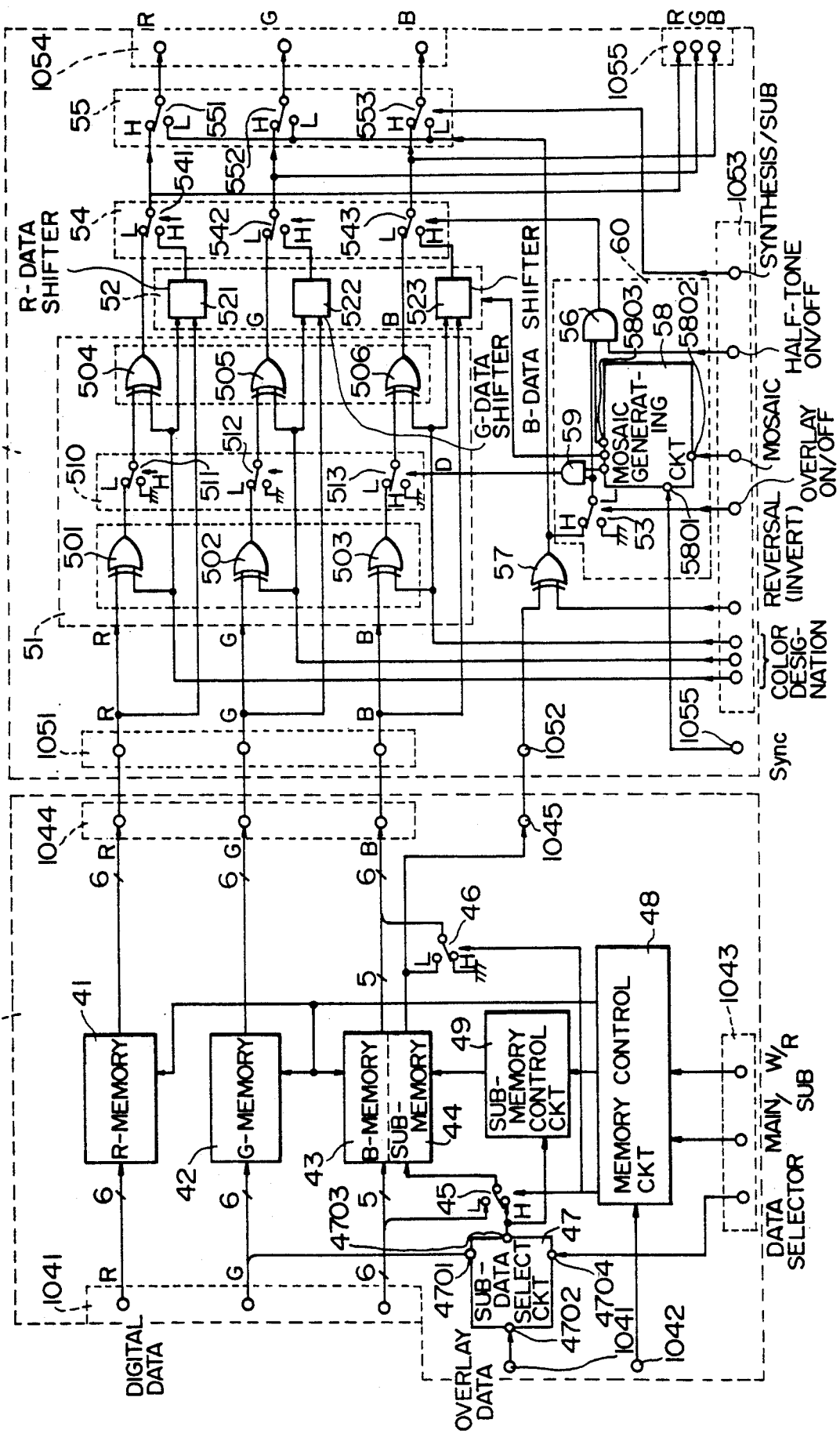
FIG. 5 is a block diagram showing circuit configurations of a memory arrangement and a memory data processing unit, respectively, which can be employed in the video printer shown in FIG. 1.

FIG. 5 shows, by way of example, the circuit configurations of the memory unit 4 and the data processing unit 5, respectively. In this figure, the input/output terminals corresponding to those shown in FIG. 1 are denoted by like reference numeral as those used in the latter. Referring to FIG. 5, the memory unit or arrangement 4 includes a main R-memory 41, a main G-memory 42, a main B-memory 43, a sub-memory 44, a sub-data input switch 45, a sub-data output switch 46, a sub-data select switch circuit 47, a memory control circuit 48 and a sub-memory control circuit 49. On the other hand, the data processing unit 5 is composed of a data replace circuit 51, a data shift circuit 52, a half-tone switch circuit 54, a data output switch circuit 55, an Exclusive-OR gate 57 and an overlay control circuit 60. The data replace circuit 51 is constituted by Exclusive-OR gates 501 to 506 and data replace switches 511 to 513 (generally denoted by 510). The overlay control circuit 60 is constituted by an overlay on/off switch 53, AND gates 56 and 59 and a mosaic generating circuit 58.

Now, description will be directed to the operation of the memory unit 4. The R-, G- and B-digital data applied to the respective input terminals 1041 are supplied to the associated main memories 41, 42 and 43, respectively, to be stored therein in response to a write (WE) command produced by the memory control circuit 48 under a write/read (W/R) command issued by the system controller 8. The least significant bit (LSB) memory area of the B-memory 43 can also serve as the sub-memory 44 for storing therein the LSB of the B-signal or the data (one-bit data) to be overlaid as supplied through the sub-data input switch 45. Both the sub-data input switch 45 and the sub-data output switch 46 are controlled by the system controller 8 by way of the memory control circuit 48. More specifically, when the B-memory 43 is to be used for storing the ordinary picture without overlay, the two sub-data switches 45 and 46 mentioned above are closed to the respective contacts labeled "L". In this state, a picture or image of full bits is stored in the B-memory 43. On the other hand, when the overlay feature is to be realized, these sub-data switches 45 and 46 are closed to the respective contacts labeled "H". In this state, the overlay data (i.e. data to be overlaid) is allowed to be stored in the sub-memory 44. In that case, the B-signal read out from the B-memory 43 is a data lacking one bit (e.g. 5-bit data when the complete B-signal data is of a 6-bit structure), wherein the LSB (least significant bit) of the data read out from the B-memory 43 is replaced by "H" data (or alternatively by "L" data). The sub-data selecting circuit 47 selects as the output thereof the data resulting from the decoding of a luminance signal of a graphic pattern to be overlaid or the G-signal (e.g. data resulting from the decoding of the most significant bit or the two more significant bits thereof), as will be described hereinafter.

The sub-memory control circuit 49 serves as a means for storing a second graphic/character data in superposition to a first graphic/character data stored first in the sub-memory 44. More specifically, the input data of the first graphic/character data is stored in the sub-memory 44, wherein when the second graphic/character data is to be superposed or overlaid on the first graphic/character data, the sub-memory control circuit 49 outputs the write signal WE at the timing corresponding to the region where the second graphic/character is to be overlaid, to thereby write "H" (or "L") in the sub-memory 44.

Next, operation of the data processing unit 5 will be explained. In the state in which the input picture signal (signal at the terminal array 1051) is to be outputted to the terminals 1055, as it is, the overlay on/off signal produced by the system controller 8 is "OFF" and thus at the level "L". At that time, the overlay switch 53 is closed to the contact labeled "L" and produces the output "L", resulting in the AND gate 59 producing the output "L", whereby all the data replace switches 511, 512 and 513 (generally denoted by 510) are closed to the respective contacts "L". Further, the output of the AND gate 56 is also "L", whereby the half-tone switches 541, 542 and 543 (generally denoted by 54) are all closed to the respective contacts "L". Similarly, the data output switches 55 (551, 552 and 553) are closed to the contacts "L" in response to a command signal from the system controller 8. In this state, the R-, G- and B-signals inputted to the terminal array 1051 are outputted in the same state to the output terminals 1055 by way of the Exclusive-OR gates 501 to 503, the data replace switches 511 to 513 and the Exclusive-OR gates 504 to 506 of the preceding stage, and the half-tone switches 541 to 543. At that time, the state of the output data is the same as that of the input picture data regardless of whether the other inputs of the Exclusive-OR gates 501 to 506, i.e. the color designation signal assumes "H" or "L".

When an overlay in a single color (i.e. monochromatic overlay) is to be realized, only the overlay on/off signal is set to "H" level. The monochromatic color of concern is made available by selecting one of eight colors corresponding to the combinations of "H" and "L" of the three color designation signals, as will be described later on. At this time point, the overlay switch 53 is closed to the contact "H", whereby the data replace switches 510 (i.e. 511, 512 and 513) are controlled by the output of the sub-memory 44 by way of the Exclusive-OR gate 57 and the AND gate 59. Assuming now that the overlay invert signal applied to the other input of the Exclusive-OR gate 57 is "L", the output of the sub-memory 44 changes over the data replace switches 510 in accordance with the content thereof. More specifically, when the sub-memory data 44 is "L", the data applied to the terminal array 1051 is transferred to the output terminals 1055, as they are. On the other hand, in case the sub-memory data is "H", the data replace switches 510 are closed to the respective contacts "H" which are grounded, whereby the data appearing at the output terminals 1055 assumes either "H" or "L" level for the individual colors, respectively. The output level is selected in dependence on the level of the color designation signal. More specifically, when the color designation signal is at the level "L", the input data is not inverted by the Exclusive-OR gates 501 to 506, resulting in appearance of the level "L" at the terminals 1055. On the other hand, when the color designation signal is at the level "H", the Exclusive-OR gates 501 to 506 invert the respective input data, resulting in the level "H" at the terminals 1055. Thus, the R-, G- and B-color signals produce an overlay in black when they are all at the level "L", while producing the overlay in white when these color signals all assume the level "H". Further, in dependence on the combinations of the levels of the three signals, there can be selectively generated overlays of six colors (yellow, cyan, green, red, magenta and blue), respectively. As will be understood from the above description, when the data stored in the sub-memory 44 is "H", there is produced an overlay picture output of the level "L".

When the overlay reverse or invert signal is selected to be "H", the data replace switches 510 mentioned above are changed over to the respective contacts labeled "H", which results in the replacement of the overlay and the picture with each other. This change-over function can be selectively made use of for generating alternately, for example, an overlay of a character string in black or an overlay of a region enclosing a heat-like graphic in red.

Next, description will be made of the half-tone function. In this conjunction, let's assume, by way of example, that the region located outside of a heart-like graphic pattern is to be generated as an overlay and that the background of a picture to be overlaid is to make an appearance of faintness. This function can equally be realized in such a manner as mentioned below. In this case, the overlay on/off signal and a half-tone on/off signal are set to the level "H". At that time, the half-tone switches 54 (541, 542 and 543) are changed over in synchronism with the data replace switches 510 (511, 512 and 513) through the AND gate 56. When the output of the AND gate 56 is at the level "H", the half-tone switches 54 are closed to the respective contacts "H" to allow the data of the data shift circuits 52 (521, 522, 523) to be outputted.

Each of the data shift circuits 52 contains the color designation signal at the most significant bit (MSB) position, while shifting the bits of the input picture signal by one bit to the right, so as to hold the MSB of the input signal at the second most significant bit position, the second bit of the input signal at the third bit position and so on. Thus, the output produced at each of the terminals 1055 for the overlay image takes a value of which the MSB is at a level determined by a corresponding one of the color designation signals and the other bits following the MSB are the same as those of the input signal for the overlay image, but are shifted one bit position to the right. Therefore, each of the R-, G- and B-picture components of the output signal produced at the terminals 1055 for the overlay image is at a level corresponding to an average of the input picture signal and the color designation signal.

On the other hand, the mosaic generating circuit 58 serves for displaying alternately at a selected ratio the half-tone region and the monochromatic region of the input picture for the overlay in a stripe-like pattern or in a mosaic-like pattern. For generating the stripe-like display, the signals "H" and "L" are alternately applied to the AND gate 56. When the signal "H" is applied to the AND gate 56, the half-tone switches 54 are closed to the respective positions "H", as a result of which the half-tone signals are outputted from the terminals 1054, while application of the signal "L" to the AND gate 56 causes the half-tone switches 54 to be closed to the contacts "L", resulting in a monochromatic signal being outputted from the terminals 1054. By varying the duty cycle of the signal "H" (i.e. the impulse factor between the signals "H" and "L"), it is possible to emphasize the monochromatic display portion more than the half-tone region or vice versa. Parenthetically, it is to be noted that the overlay can be displayed in such a stripe-like pattern in which the input picture and the monochromatic portion appear alternately.

The data output switches 55 (551, 552, 553) serve for changing over the picture data of the main memories 41 to 43 and the overlay picture of the sub-memory 44 with each other for the purpose of confirmation.

In the foregoing, the data replace circuit 51 has been described as being implemented by Exclusive-OR gates and switches. It should however be understood that the invention is not restricted to the illustrated arrangement but other combinations of logic elements or a ROM (read-only memory) may equally be adopted, so far as outputs equivalent to those mentioned above can be obtained.

Further, although it has been assumed that the bit number of the memory is six, the invention is never restricted to such bit number but may be eight bits or more.

Figure 6:
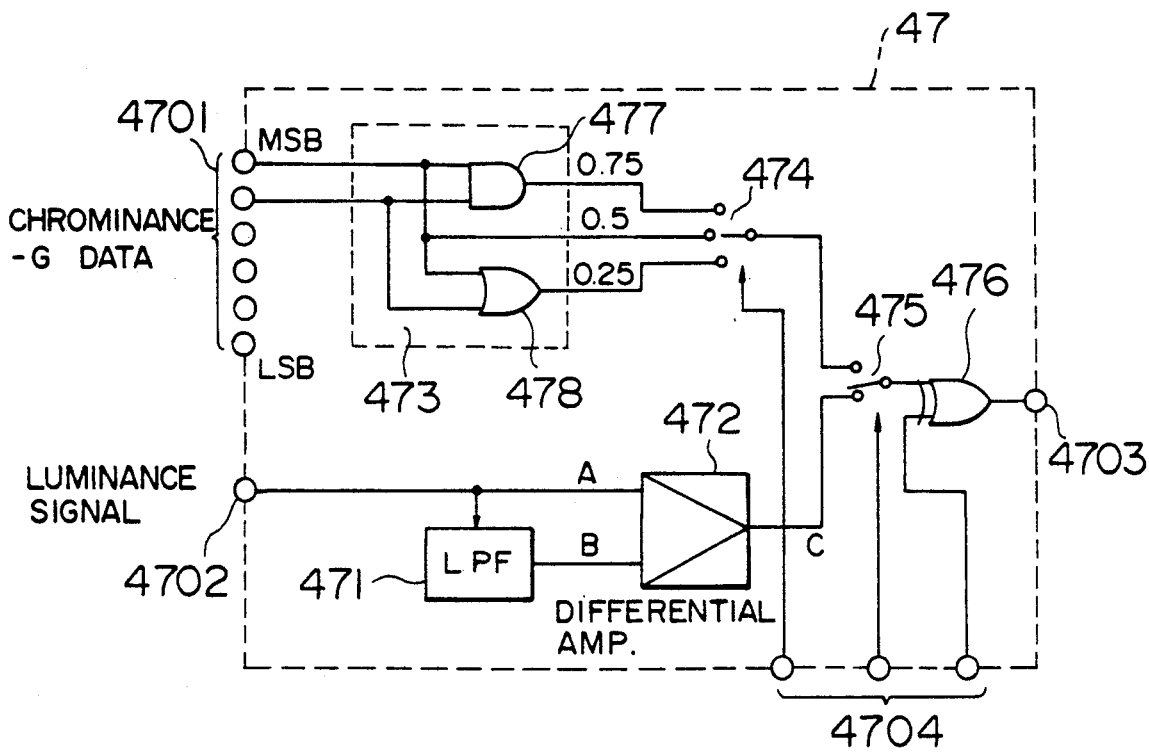
FIGS. 6 and 7 are views showing a structure of the sub-data selecting circuit and signal waveforms making appearance at circuit points A, B and C thereof, respectively.

FIG. 6 shows an exemplary circuit configuration of the sub-data select circuit 47 which is adapted to selectively utilize either the G-chrominance signal of an image to be overlaid or the luminance signal thereof to thereby produce the data for the image to be overlaid. In FIG. 6, reference numeral 471 denotes a low pass filter (LPF), numeral 472 denotes a differential amplifier, 473 denotes a decoder, 474 denotes a decode switch, 475 denotes a data switch and a numeral 476 denotes an Exclusive-OR gate. The decoder 473 is composed of an AND gate 477 and an OR gate 478 in the case of the illustrated embodiment. Input terminals 4701 are supplied with the G-chrominance data of a graphic/character pattern to be overlaid, while an input terminal 4702 is supplied with the luminance signal of the graphic pattern.

Figure 7:
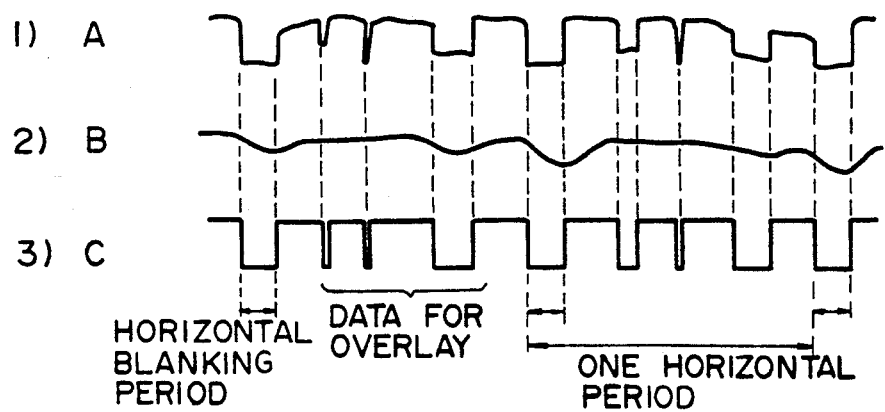

In operation of the sub-data select circuit shown in FIG. 6, the decoder 47 detects levels (which may assume the maximum (MAX) level 1.0 and the minimum (MIN) level of 0.0) of the G-chrominance data with reference to threshold levels of 0.25, 0.5 and 0.75, respectively, wherein the detected data is supplied to the decode switch 474 to be selected under the control of a signal issued by the system controller 8. On the other hand, the luminance signal is supplied directly to one input terminal of the differential amplifier 472 and indirectly to the other input terminal thereof through the low pass filter or LPF 471. The output of the LPF 471 is of such a waveform as shown in FIG. 7 at (B). Through comparison of the output waveform of the LPF 471 with the luminance signal, the data for overlay can be generated. It should be noted that in passing the luminance signal through the LPF 471, the whole luminance signal inclusive of the overlay luminance signal is smoothed or averaged, as the result of which the luminance signal for the overlay can be extracted with high accuracy through comparison with the directly inputted luminance signal notwithstanding changes in the background level for the character/graphic patterns. Further, by virtue of the forward/reverse function of the Exclusive-OR gate 476, it is also possible to overlay the output of the data switch 475 by exchanging the data part for the graphic pattern with the data for the region outside of the graphic pattern.

Figure 8A:
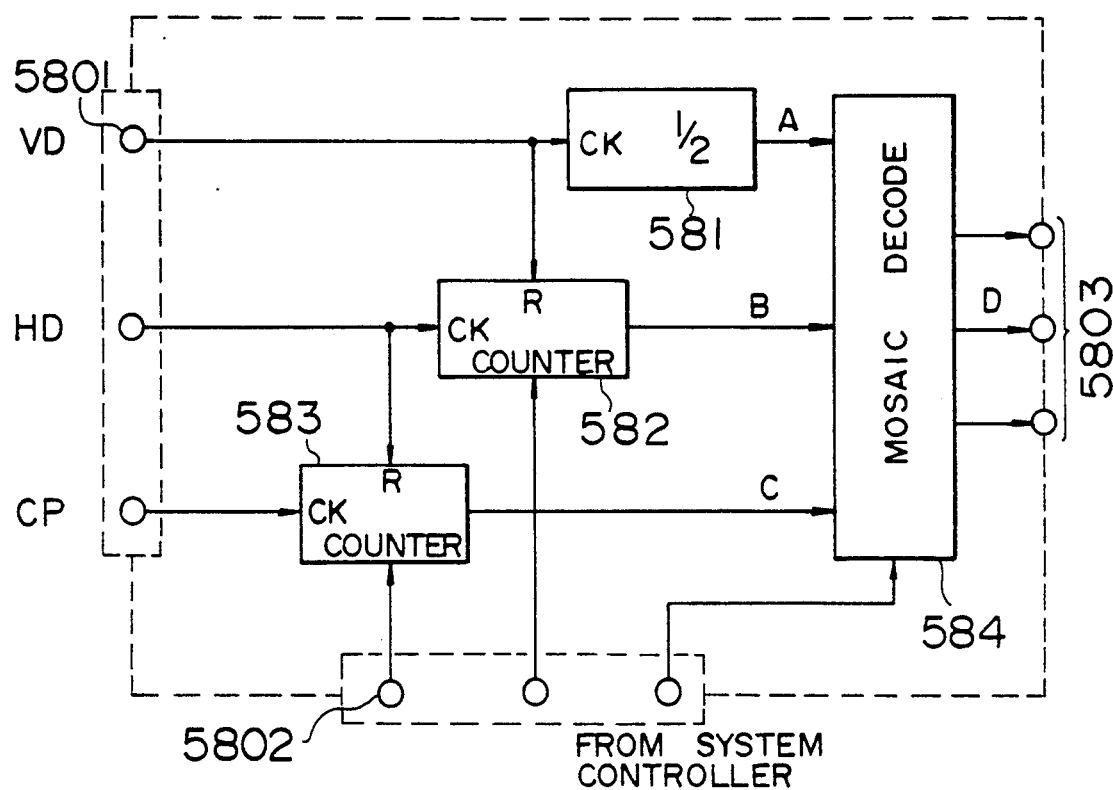
FIGS. 8A and 8B are diagrams showing a structure of a mosaic generating circuit and a mosaic pattern, respectively.
Figure 8B:
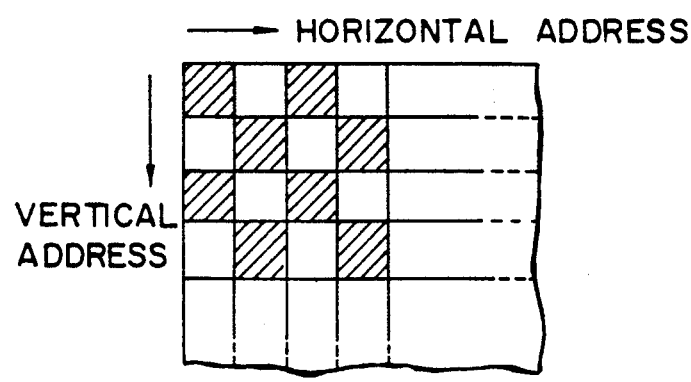

FIG. 8A shows, by way of example, a circuit configuration of the mosaic generating circuit 58 shown in FIG. 5. In FIG. 8A, reference numeral 581 denotes a by-2 frequency division circuit, 582 and 583 denote frequency division ratio varying counters, and numeral 584 denotes a mosaic decoder. A signal A is obtained from the division of the vertical synchronizing (VD) signal by two and represents a field switching timing of the picture. A signal B is obtained from the decoding by frequency division of the horizontal synchronizing (HD) signal and reset by the vertical synchronizing signal. This signal B is utilized as a vertical address signal which indicates an address in the vertical direction of a mosaic pattern shown in FIG. 8B. A signal C is derived from decoding by the frequency division of the clock pulse (CP) and reset by the horizontal synchronizing signal. This signal C is utilized as the horizontal address signal indicating an address in the horizontal direction of the mosaic pattern shown in FIG. 8B. Through a combination of the above-mentioned signals B and C, an output signal D representative of the mosaic array is produced. The frequency division ratios of the counters 582 and 583 are determined by a corresponding command signal issued by the system controller 8.

The vertical counter 582 is synchronized with the vertical synchronizing (VD) signal by counting the horizontal synchronizing signal (HD) after having been reset by the VD signal. Similarly, the horizontal counter 583 is reset by the horizontal synchronizing (HD) signal to be brought into synchronism with the (HD) signal. By changing the frequency division ratios set in the counters 582 and 583 to thereby change the duty ratios of the signals B and C, it is possible to change the background density of the half-tone area. Besides, by changing the decode pattern generated by the decoder 583 by means of a signal issued by the system controller 8, there can be generated a variety of different mosaic patterns with various combinations of different densities.

Figure 9:
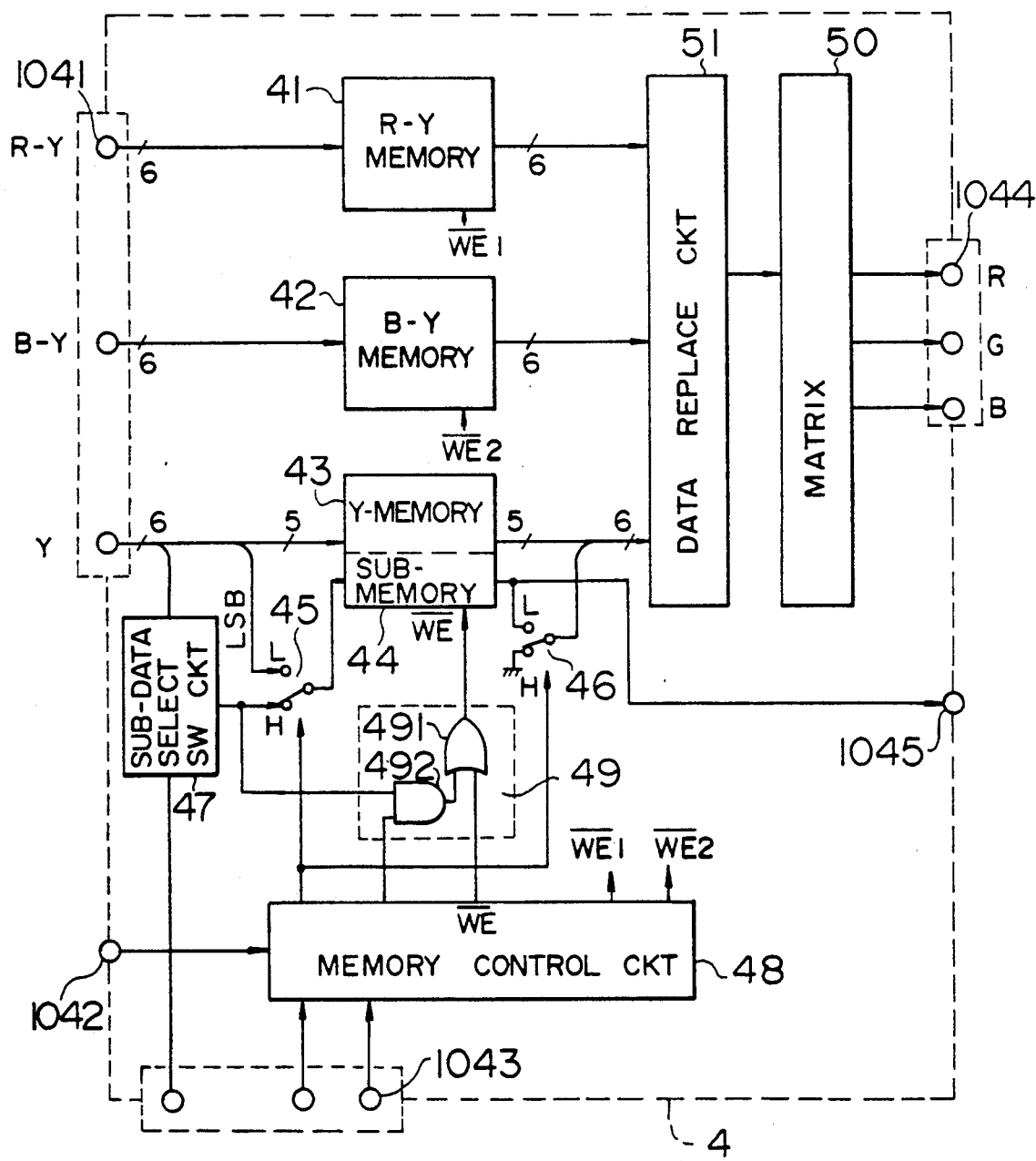
FIG. 9 is a diagram showing a circuit configuration of a memory arrangement according to another embodiment of the present invention.

FIG. 9 shows an exemplary circuit configuration of the memory unit 4 shown in FIG. 1. In FIG. 9, reference numerals 41 and 42 denote color-difference memories (R-Y, B-Y), 43 denotes a luminance (Y) memory, 44 denotes the sub-memory, 45 denotes a sub-data input switch, 46 denotes a sub-data output switch, 47 denotes a sub-data select switch circuit, 48 denotes a memory control circuit, 49 denotes a sub-memory control circuit, 50 denotes a matrix circuit and a numeral 51 denotes an adjusting circuit. The sub memory 44 can also be used commonly as the least significant bit (LSB) location of the luminance (Y) memory 43.

In operation of the memory unit 4, the LSB (least significant bit) data of the input Y-signal (luminance signal) is placed in the sub-memory 44 through the sub-data input switch 45, when no overlay is to be generated. The data read out simultaneously from the sub-memory 44 is added to the Y-signal by way of the sub-data output switch 46. In this manner, the Y-memory 43 is made use of as an ordinary memory, i.e. a full-bit memory, for example, of six bits.

On the other hand, when an overlay is to be generated, the data for the overlay is stored in the sub-memory 44 through the sub-data select switch 47, as described hereinbefore in conjunction with FIG. 5. On the other hand, upon reading of the Y-memory 43, the sub-data output switch 46 is closed to the position labeled "H", as a result of which the output of the Y-memory 43 constitutes a bit number (e.g. five bits) which is smaller than the full bit number by one bit. The data read out from the Y-memory and the color difference memories 41 and 42 are digitally separated into the three primary color signal data R, G and B by the succeeding matrix circuit 50 to be outputted from the respective terminals generally denoted by the numeral 1044.

The sub-memory control circuit 49 operates in such manner described hereinbefore in conjunction with FIG. 5 to permit overwrite operation for the sub-memory 44. The sub-data select switch 47 operates in the same manner as the decoder 473 shown in FIG. 6 to detect the data for overlay from the Y-signal data by varying the threshold value. The matrix circuit 50 may be of a digital RGB matrix configuration well known in the art to obtain the three primary color (chrominance) signals R, G and B through arithmetic operation in accordance with the following expressions:

$$R = \alpha_R (R - Y) + Y$$

$$B = \alpha_B (B - Y) + Y$$

$$G = Y - \frac{0.3}{0.59} \alpha_R (R - Y) - \frac{0.11}{0.59} \alpha_B (B - Y)$$

The adjusting circuit 51 may be of a conventional structure and serves for adjustment of color, tint (hue), contrast and brightness. By way of example, by changing the coefficients $\alpha_R$ and $\alpha_B$ at the same rate in the above expressions, there can be realized a color adjustment, while adjustment of the tint (hue) can be performed by changing the ratio between $\alpha_R$ and $\alpha_B$. Further, by amplifying the R-, G- and B-signals each with the same factor, an adjustment of contrast can be achieved. Additionally, an adjustment of brightness can equally be accomplished by adding a DC component to each of the R-, G- and B-signals. The signals R, G and B adjusted in this way are supplied to the succeeding data processing circuit 5 through the terminals 1044 to undergo a picture synthesization processing illustrated in FIG. 5. As will be appreciated from the above description, the level of the image to be overlaid remains constant regardless of the state of the adjusting circuit 51, whereby the overlay is displayed or printed out in a saturated color. Further, the half-tone level also can remain unchanged.

Figure 10:
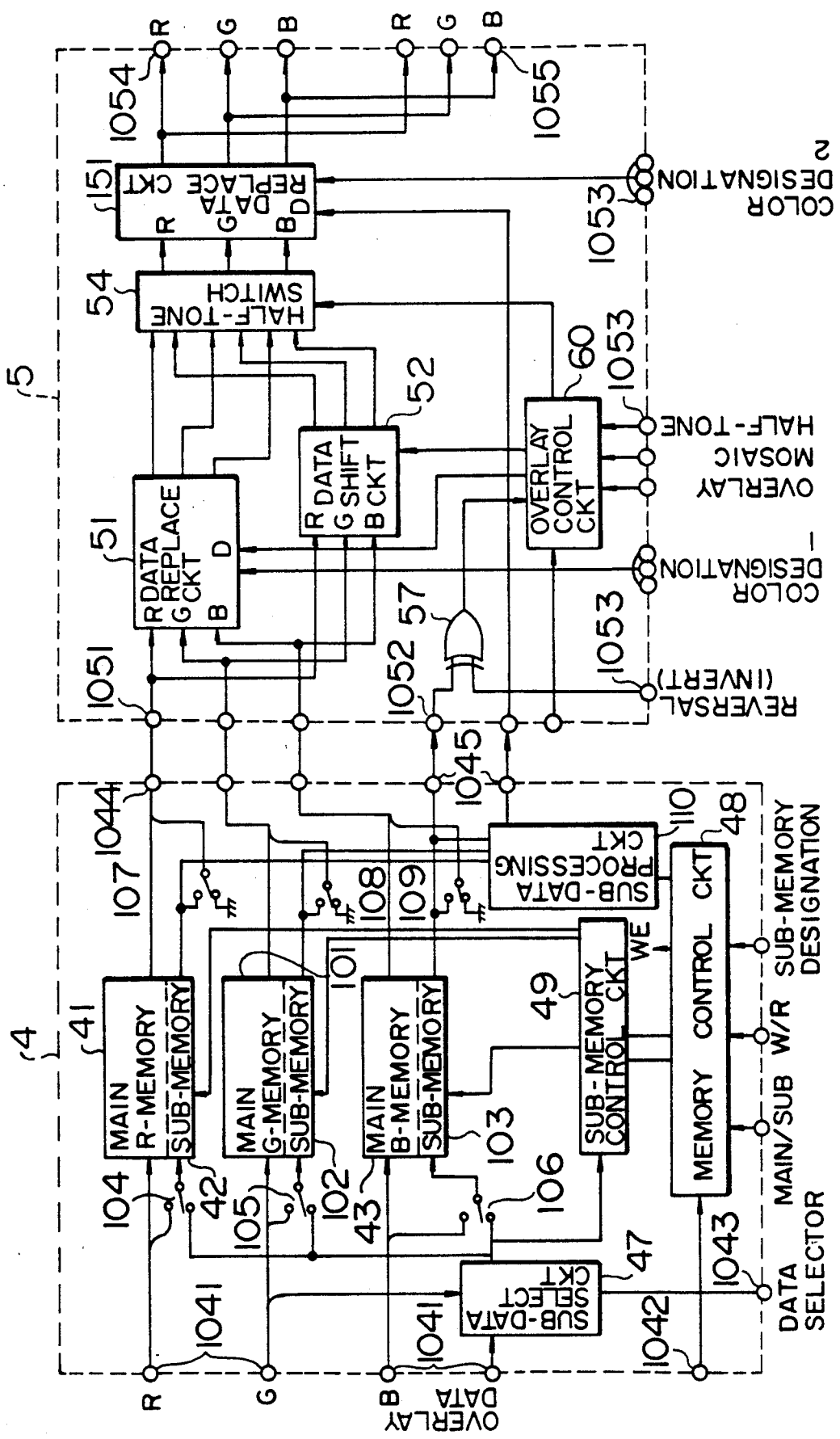
FIG. 10 is a block diagram showing a memory arrangement and a memory data processing circuit according to another embodiment of the present invention.

FIG. 10 shows other exemplary circuit configurations of the memory unit 4 and the data processing unit 5, respectively. In FIG. 10, the parts serving for the same functions as those described before by reference to FIGS. 5 and 9 are denoted by like reference numerals. Now referring to FIG. 10, reference numerals 101 to 103 denote sub-memories, 104 to 106 denote sub-data input switches, 107 to 109 denote sub-data output switches, and numeral 110 denotes a sub-data processing circuit. The data processing unit 5 is additionally provided with a second data replace circuit 151 and a second color designating terminal 1053. The outputs of the sub-memories 101 to 103 are connected to the sub-data processing circuit 110 to be added together to generate a second overlay signal which is outputted from the terminals 1054 in the case of this illustrated embodiment. The second overlay signal is then supplied to the second data replace circuit 151.

Now, description will turn to the operation of the arrangement mentioned above. A first overlay signal representing graphic data to be displayed in a half-tone is stored in the sub-memory 103 constituted by the LSB area of the B-memory 43. The output of the sub-memory 103 is supplied to the Exclusive-OR gate 57 as in the case of the apparatus shown in FIG. 5, whereby the data replace circuit 51, the data shift circuit 52 and the half-tone switch 54 are actuated through the overlay control circuit 60 to derive a signal corresponding to the graphic half-tone. In the succeeding data replace circuit 151, data replacement with the second overlay signal available from the sub-data processing circuit 110 is performed by writing on the graphic half-tone. At that time, the color for the second overlay signal is designated by the second color designating signal 1053. In other words, the color for the second overlay signal is designated independent of the color designation for the first overlay signal (i.e. the graphic half-tone).

The sub-data processing circuit 110 synthesizes exchangeably a plurality of data outputted from the sub-memories 101 to 103 in accordance with a command issued by the memory controller 48. In this manner, the data from the sub-memories 101 to 103 are outputted, being selectively synthesized. Assuming, by way of example, that greetings such as those illustrated in FIGS. 11A and 11B are to be printed out as a hard copy, the contents of the greeting may often vary a little in dependence on addresses such as relatives, acquaintances, friends and others. More specifically, referring to FIGS. 11A and 11B, such a situation may be encountered in which a character string 1103 shown in FIG. 11A is exchanged by a character string 1104 shown in FIG. 11B without changing half-tone area 1101 and character string 1102 upon printing of the greeting cards. In that case, the R-, G- and B-main memories 41 to 43 are sequentially changed to the sub-memories on a bit basis sequentially starting from the respective LSB positions. By way of example, the LSB of the R-memory 41 is changed over to the second sub-memory, the LSB of the G-memory is changed over to the third sub-memory, the second more significant bit of the B-memory 43 is changed over to the fourth sub-memory and so forth in a sequential manner. Through this procedure, all the three color main memories can also be used as the sub-memories.

Figure 12:
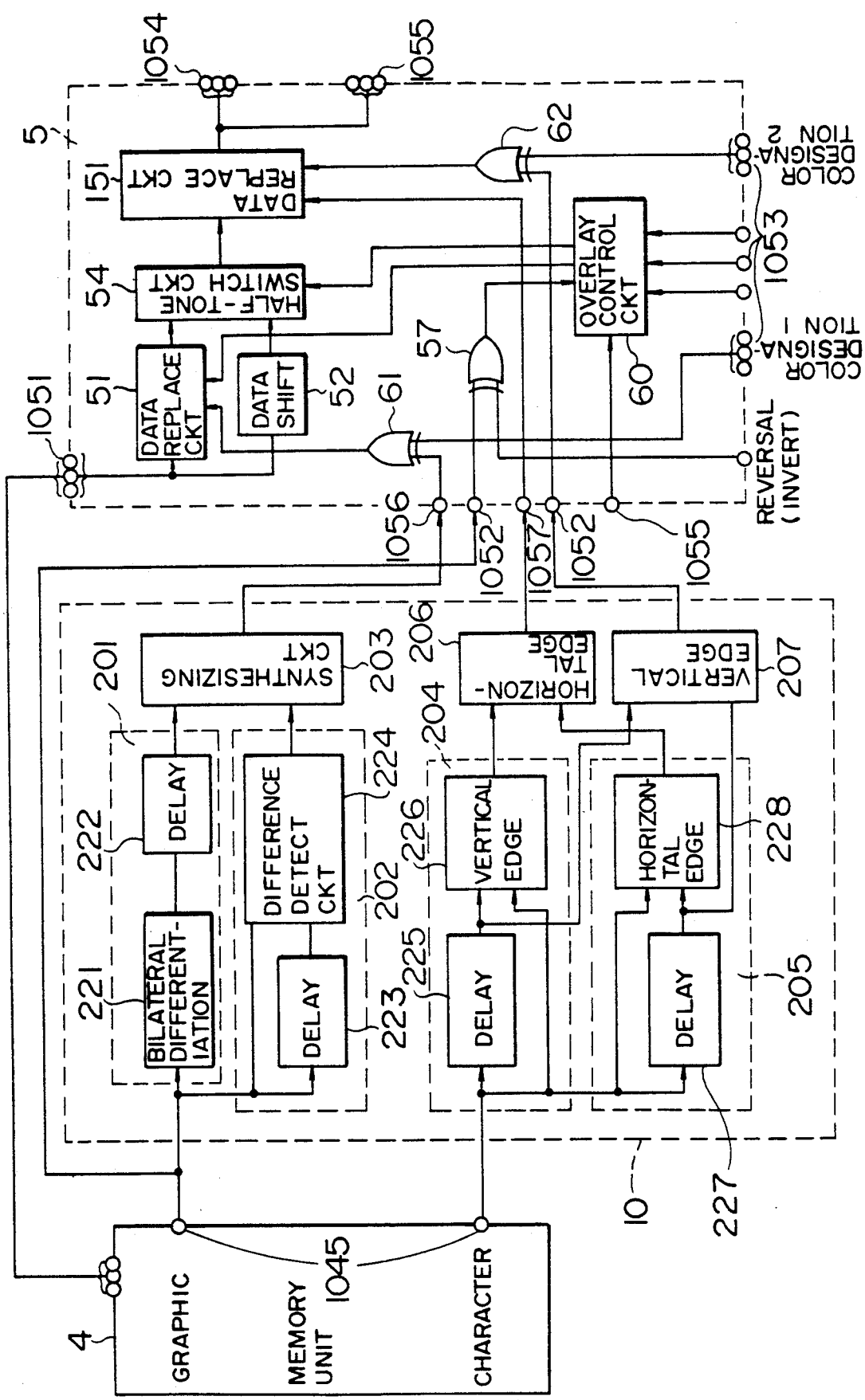
FIG. 12 is a block diagram showing a circuit configuration of a circuit for enclosing an overlay picture or graphic pattern with a frame.

FIG. 12 shows another embodiment of the video printer according to the present invention which is adapted to enclose with a frame an overlay graphic and additionally an overlay character string, if desired. More specifically, turning back to FIG. 4, it is assumed that the region lying outside of the graphic to be overlaid is to be displayed in a designated color or in half-tone with the overlay character string being displayed in a designated color, and at the same time the overlay graphic and character string are to be fringed with frames, respectively. Now referring to FIG. 12 in which parts serving for the same functions as those shown in FIG. 10 are designated by like reference numerals, a reference numeral 10 denotes an edge generator which is composed of a horizontal edge detection circuit 201, a vertical edge detection circuit 202, a graphic synthesizing circuit 203, a horizontal edge generating circuit 204, a vertical edge generating circuit 205, a character edge generating circuit 206 and a character generating circuit 207. On the other hand, in the data processing unit 5, there are connected Exclusive-OR gates 61 and 62 in the color designating signal line.

Now, description will turn to the operation of the circuit arrangement shown in FIG. 12. The horizontal edge detecting circuit 201 detects a horizontal edge component of a graphic signal and shapes the waveform of the detected signal. More specifically, referring to FIG. 13, the leading edge and the trailing edge of an input graphic signal (a) are detected by a bilateral differentiation circuit 221 (FIG. 13, (b)), being followed by generation of a signal having a predetermined time duration (FIG. 13, (c)) through the succeeding delay circuit 222. Thus, the delay circuit 222 generates a contour in the horizontal direction to thereby output a horizontal edge having a width corresponding to the delay time of several $\mu$S of the delay circuit. On the other hand, in the vertical edge detecting circuit 202, the input graphic signal is delayed by a delay circuit 223 for one or two horizontal periods, whereon a difference in the vertical direction between the input graphic signal and the output of the delay circuit 223 is detected by a difference detector 224, whereby a vertical edge is generated. The vertical edge and the horizontal edge generated in this way are synthesized by the graphic edge synthesizing circuit 203, the output signal of which is supplied to the succeeding data processing unit 5. In the data processing unit 5, the graphic edge signal is applied to the Exclusive-OR gate 61 together with a color designation signal for the graphic to be overlaid, the output of the Exclusive-OR gate in turn being supplied to the data replace circuit 51. As a result, the graphic as overlaid is enclosed by a heart-like frame in a color complementary to that of the half-tone area, as is illustrated in FIG. 4.

The contour detecting operation of a character string is basically the same as the edge detection of the graphic mentioned above. The only difference from the latter is that the processing mentioned below is performed by using delay circuits 225 and 227 in order to maintain constant the thickness of character line segments even in case the input character is written thin. More specifically, referring to FIG. 14, the horizontal edge detecting circuit 226 generates an edge signal 1401 from the leading edge of the input signal and that of the delayed signal and additionally generates an edge signal 1402 having the same pulse width as the edge signal 1401 from the trailing edge of the delayed signal. The vertical edge detecting circuit 228 operates similarly to the horizontal edge detecting circuit 226 for synthesizing the trailing edge of the output signal of the delay circuit 227 delayed by one or two horizontal periods with the leading edge of the input character signal to thereby output a character vertical edge signal. These horizontal and vertical edge signals for the characters are synthesized by the character edge generating circuit 206 to be outputted as the character edge signals. As the result, the upper, lower, left and right contours can be imparted to a character without changing the thickness in the vertical and horizontal directions. The character edge signal is inputted to the Exclusive-OR gate 62 of the succeeding data processing unit 5 together with the color designation signal 2, the output of the Exclusive-OR gate 62 in turn being supplied to the data replace circuit 151. The colors of the character and the contour are complementary to each other as in the case of the graphics.

Figure 15:
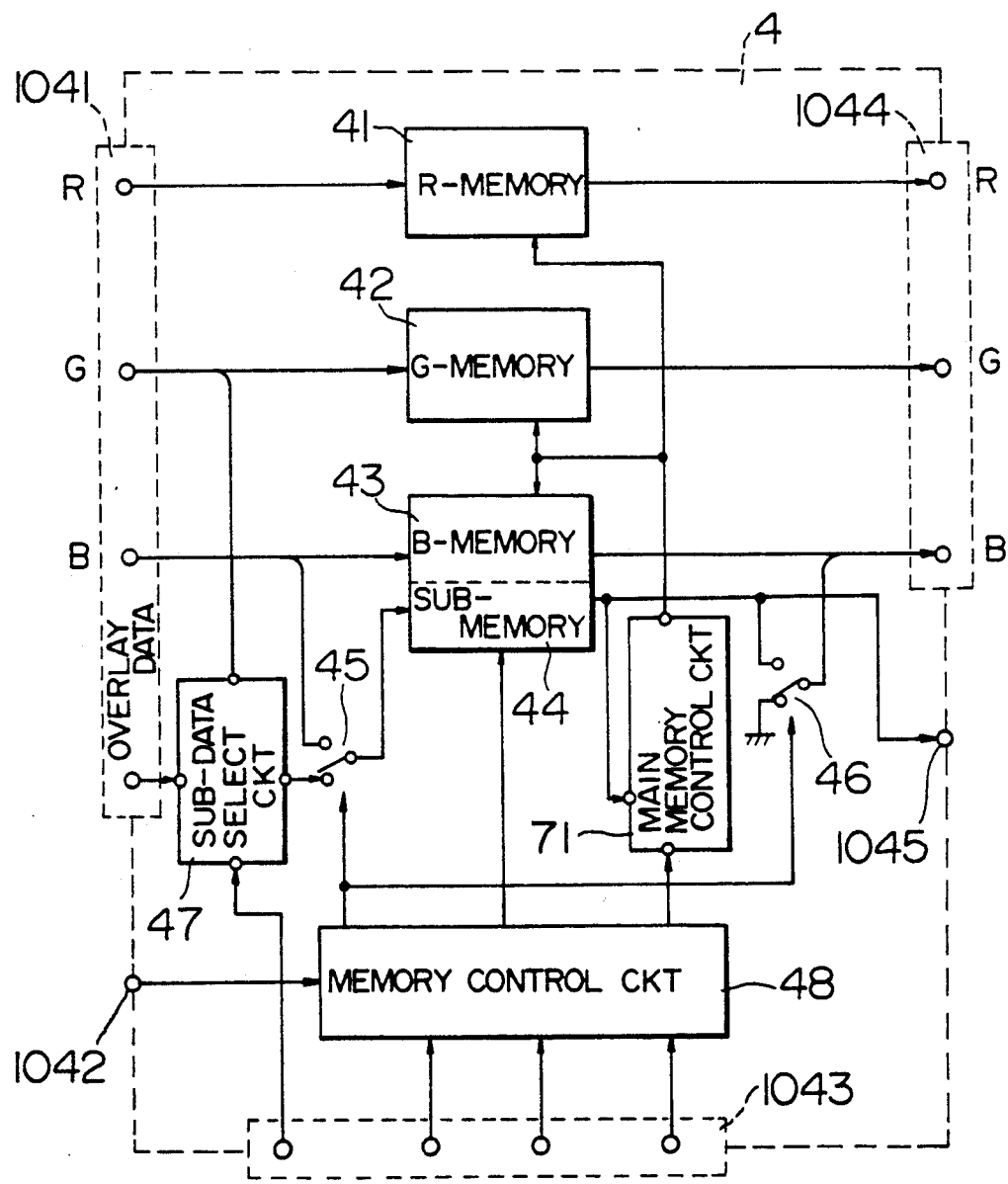
FIG. 15 is a block diagram showing a circuit configuration of a memory device used for overlaying another picture on an original picture according to another embodiment of the present invention.

FIG. 15 shows another exemplary configuration of the memory unit 4. In this figure, parts having the same functions as those shown in FIGS. 5 and 10 are denoted by like reference numerals. Referring to FIG. 15, a numeral 71 denotes a main memory write (WE) control circuit which is implemented similarly to the sub-memory control circuit 49 described previously by reference to FIG. 9. The circuit configuration of the memory unit 4 shown in FIG. 15 is substantially the same as the memory unit 4 shown in FIG. 5 except for the difference mentioned above.

Figure 16:
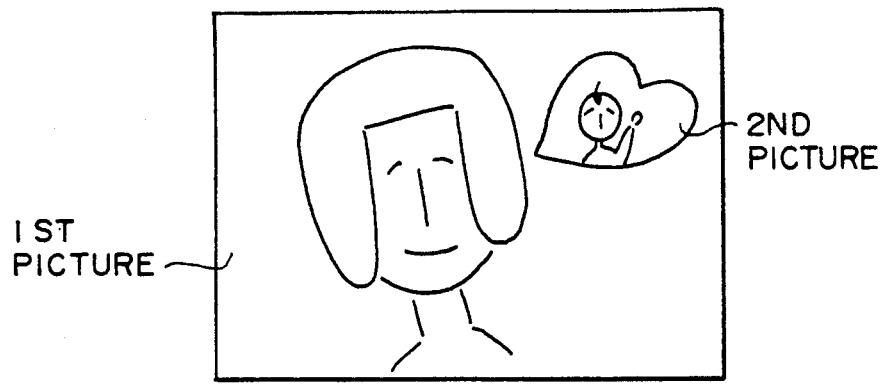
FIG. 16 is a view illustrating examples of a printed picture generated by the circuit shown in FIG. 15.

The function of the memory unit 4 shown in FIG. 15 is to overlay a second picture on a first picture stored previously, to thereby obtain a synthesized picture shown in FIG. 16 which is to be printed out. To this end, the first picture is stored in the main memories 41 to 43 through cooperation of the memory control circuit 48 and the main memory WE control circuit 71. Subsequently, an area which is to be inlaid with the second picture is stored in the sub-memory 44. Subsequently, the write or WE command is outputted by the main memory WE control circuit 71 in accordance with the area data stored in the sub-memory 44. In other words, the second picture is stored in the main memories 41 for only the area stored in the sub-memory 44.

In that case, by employing simultaneously the edge generating circuit shown in FIG. 12, boundary lines may be inlaid for the two pictures, respectively, stored in the main memories 41 to 43. Further, by resorting to the use of the data processing circuit 5 shown in FIG. 5, the second picture can be printed in half-tone of a designated color.

Figure 17:
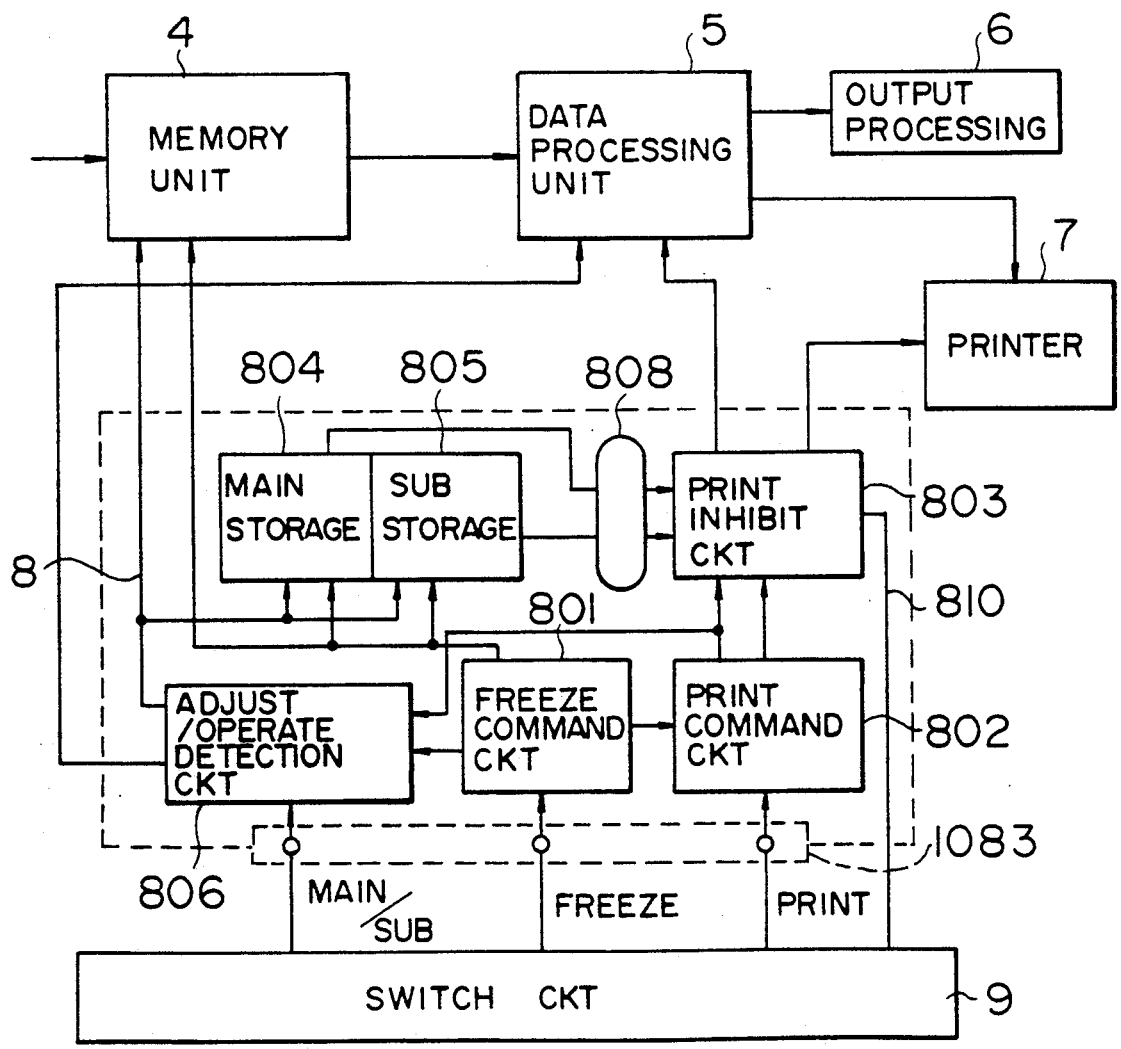
FIG. 17 is a view showing a circuit configuration of a system controller used in a video printer according to the invention.

FIG. 17 shows another embodiment of the memory unit 4, the printer 7 and the system controller 8, respectively. Referring to FIG. 17 in which parts serving the same functions as those shown in FIGS. 1 and 5 are denoted by like reference numerals, the system controller 8 is constituted by a freeze command circuit 801, a print command circuit 802, a print inhibit (disable) circuit 803, a main freeze storage 804, a sub-freeze storage 805 and an adjustment/operation detecting circuit 806.

In operation, a freeze signal (write signal), a print signal and a main/sub designation signal are inputted to terminals generally denoted by 1083 from the switch circuit 9. In response to the freeze signal, the freeze command circuit 801 issues a freeze command signal to the memory control circuit 48 (refer to FIG. 5) constituting a part of the memory unit 4, the main freeze storage 804 and the sub-freeze storage 805, respectively. At the same time, a designation signal designating the main memory or the sub-memory is also outputted. The main freeze storage 804 and the sub-freeze storage 805 are placed with signals indicating whether data is to be written or not in the main memories and the sub-memory, respectively. On the other hand, the print command means 802 responds to the print signal from the print command circuit 9 to thereby issue a print command to the data processing circuit 5 and the printer 7 by way of the print inhibit circuit 803.

Subsequently, the print inhibit circuit 803 is supplied with a print decision signal indicating whether or not the data is written in the main memories and the sub-memory from the main freeze storage 804 and the sub freeze storage 805, respectively. More specifically, when only the content in the main memories is to be printed without using the sub-memory, the print inhibit circuit 803 controls the print command on the basis of only the decision signal from the main freeze storage 804. On the other hand, when the print is to be carried out by using also the sub-memory, the print inhibit circuit 803 controls the print command on the basis of both the print decision signal from the sub freeze storage 805 and the print decision signal from the main freeze storage 804. When the signal from the sub freeze storage 805 indicates that no data is placed in the sub-memory area, the print inhibit signal is issued. When it is decided that the print is to be inhibited by the print inhibit circuit 803, an incomplete freeze signal is sent to the switch circuit 9 to be displayed.

The adjustment/operation detecting circuit 806 and the print inhibit circuit 803 are closely related to each other in such a manner that upon start of the print operation in response to the print command, the adjustment-/operation detecting circuit 806 holds the functions of all the adjusting means (such as that of the data replace circuit 51) and issues a signal 810 for inhibiting all the operations such as change-over of the sub-memory, color designation (or allocation) to a synthesized picture and other functions. On the other hand, in the state where the adjustment or operation mentioned above is being carried out, a signal for disabling the print command is sent to the print inhibit means 803.

Figure 18:
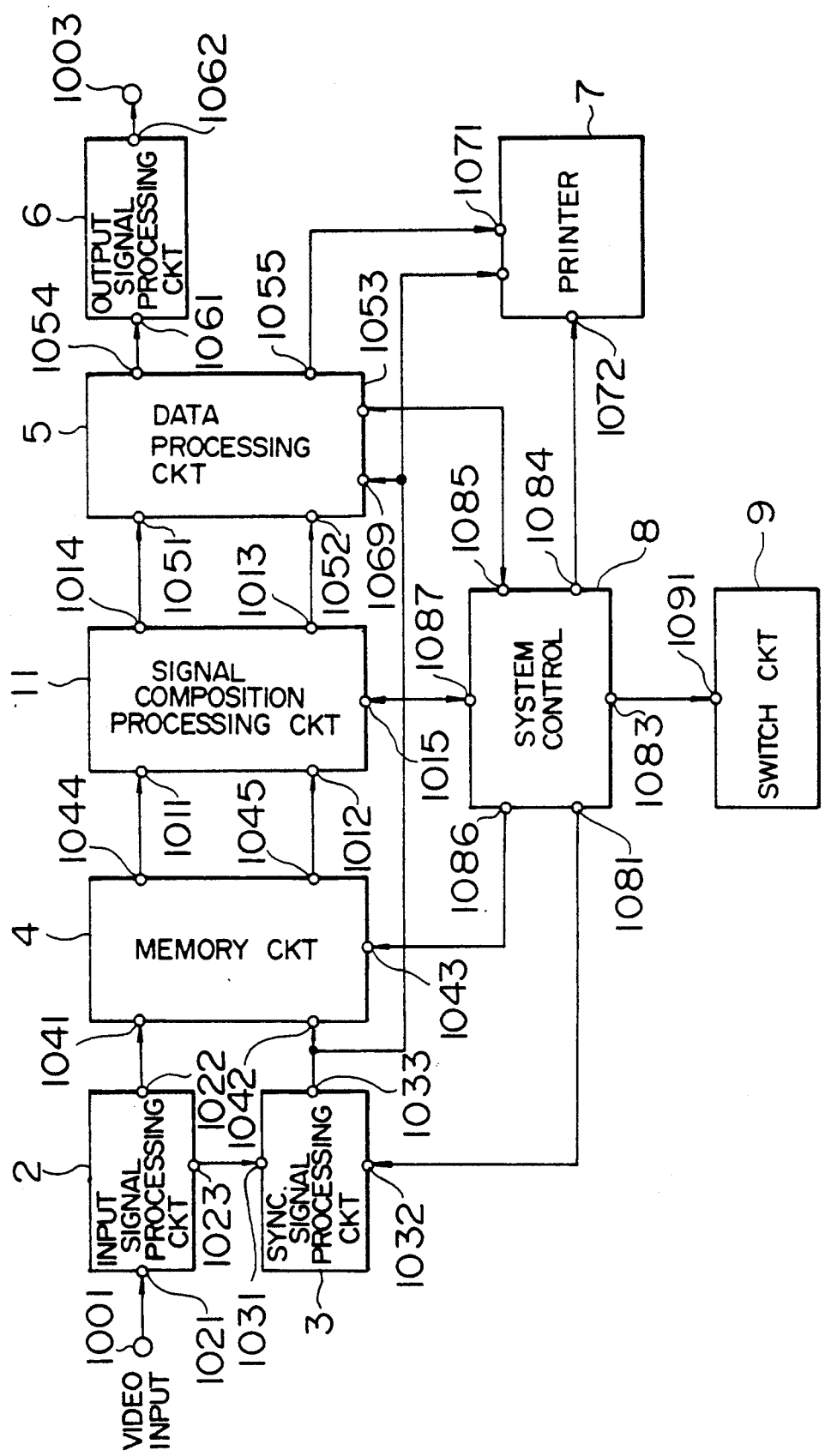
FIG. 18 is a block diagram showing schematically a circuit arrangement of the video printer according to a further embodiment of the present invention.

FIG. 18 shows a further embodiment of the present invention, in which parts serving the same functions as those shown in FIG. 1 are denoted by like reference numerals. In FIG. 18, a numeral 11 denotes a signal restoration processing circuit.

In operation, a composite video signal or luminance/-chrominance (Y, C) signals applied to the video input terminal 1001 undergoes directly an analogue/digital conversion in the input signal processing circuit 2 to be subsequently stored in the memory unit 4. On the other hand, the input video signal to the sub-memory is supplied from the sub-data select circuit 47 (FIG. 6) incorporated in the memory unit 4. The main video signal (composite video signal or Y and C signals) read out from the memory unit 4 is supplied to the signal restoration processing circuit 11 to be restored to an analogue signal, which is then separated into three primary color R-, G- and B-signals to again undergo an analogue/digital conversion. In this manner, the main data is supplied to the succeeding data processing circuit 5 along with the data for the overlay. This data processing circuit 5 operates in the same manner as described hereinbefore in conjunction with FIG. 1, to thereby generate a composite main/overlay picture signal.

Figure 19:
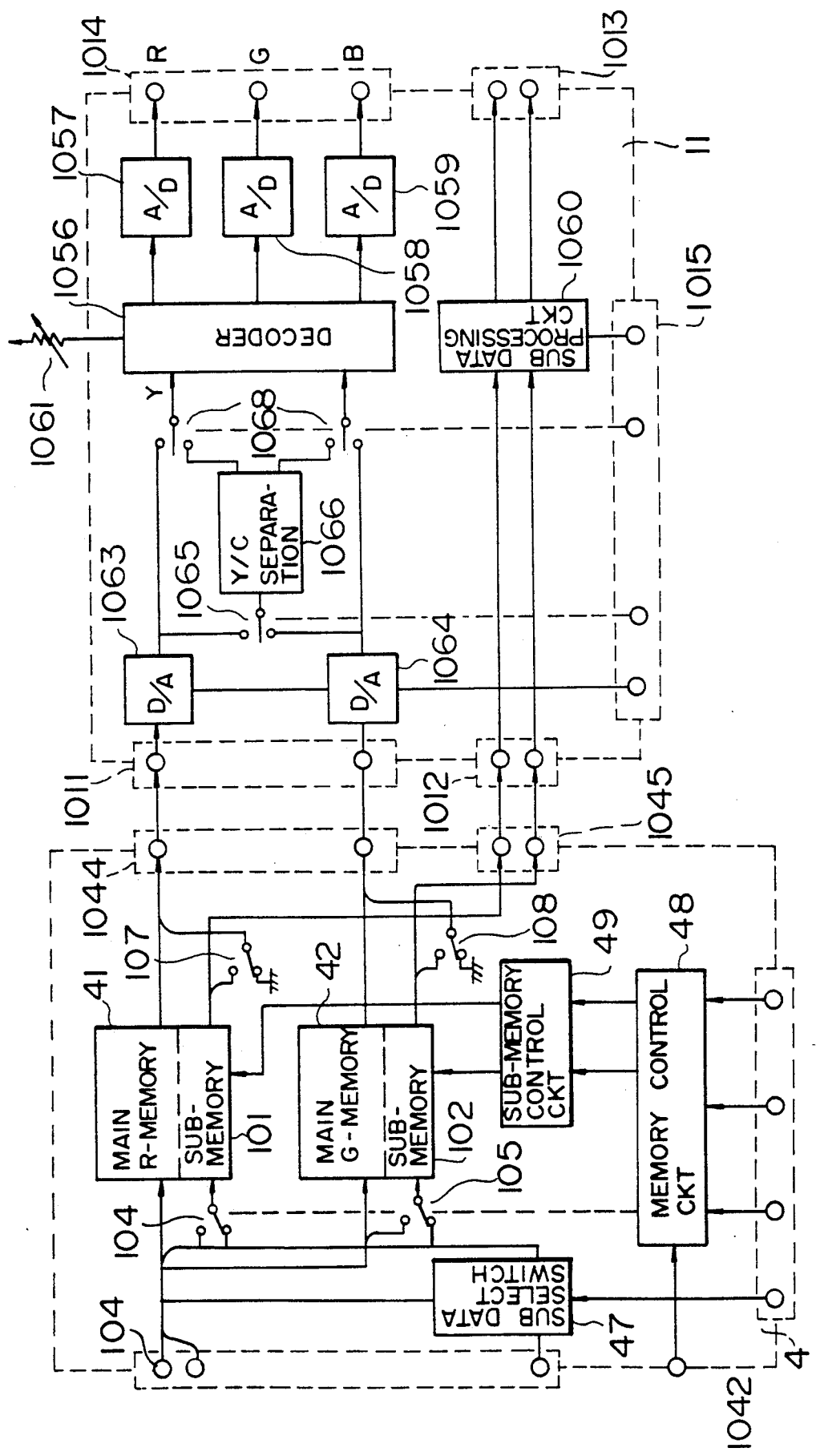
FIG. 19 is a block diagram showing circuit configurations of the memory arrangement and the signal synthesizing circuit shown in FIG. 18.

Further embodiments of the memory unit 4 and the signal restoration processing circuit 11 are shown in FIG. 19 in which parts serving the same or equivalent functions as those shown in FIG. 18 and 10 are denoted by like reference numerals. Referring to FIG. 19, the signal restoration processing circuit 11 is composed of digital/analogue converters (hereinafter referred to as D/A converter) 1063 and 1064, a signal selector 1065, a Y/C separator 1066, an input selector 1068, a decoder 1056, analogue/digital converters (hereinafter referred to as A/D converter) 1057 to 1059, a sub-data processing circuit 1060 and an adjusting circuit 1061.

In operation, the memory unit 4 is supplied with a picture (video) signal or luminance and chrominance signals through the input terminal array 1041, which signal is then stored in the main memory 41 or 42, which are so arranged as to be changed over to the sub-memory 101 or 102 for the data for the overlay, starting from the respective least significant bit (LSB), as described hereinbefore. The sub-memory data is selected from the video signal data or the luminance signal by the sub-data select circuit 47 implemented in such structure as shown in FIG. 6. The sub-data is then stored in the sub-memory 101 or 102 through the sub-data input switch 104 or 105. The writing of the sub-data to the sub-memory 101 or 102 is controlled by the sub-memory control circuit 49.

When the overlay data is not stored in the sub-memory 101 or 102, all the bits of the input signal (composite picture signal or luminance and chrominance signals) are stored in the main memory 41 or 42. At the same time, the data as read out is supplied to the succeeding stage from the terminal array 1044 through the sub-data output switches 107 and 108.

In the signal restoration processing circuit of the succeeding stage, the digital signal inputted through the terminal array 1011 is restored to an analogue signal by the D/A converters 1063 and 1064. In case the composite video signal is inputted through the terminal array 1011, the signal selector 1065 selects one of the output signals of the A/D converters 1063 and 1064, wherein the selected video signal is separated into luminance and chrominance signals by the Y/C separator 1066. Subsequently, one of the output signals of the Y/C separator 1066 and one of the output signals of the D/A converters 1063 and 1064 as selected by the input selector 1068 are supplied to the decoder circuit 1056 to be separated into the three primary color R-, G- and B-signals which are then converted into digital signals through the A/D converters 1057, 1058 and 1059, the digital signals being supplied to the succeeding stage. On the other hand, the sub-data inputted through the terminal array 1045 is selected or synthesized by the sub-data processing circuit 1060 to be outputted to the succeeding stage through a terminal array 1013.

The adjusting circuit 1061 serves for adjustment of the R-, G- and B-signals in respect to color, tint (hue), contrast, brightness and others.

The R-, G- and B-signals thus adjusted by the adjusting circuit 1061 are synthesized with the sub-memory data in the data processing circuit 5 of the succeeding stage. At this juncture, it is to be mentioned that this data is always synthesized at full respective levels regardless of the adjusted levels so that the synthesized picture is always generated on the monitor screen in a saturated color.

Figure 20:
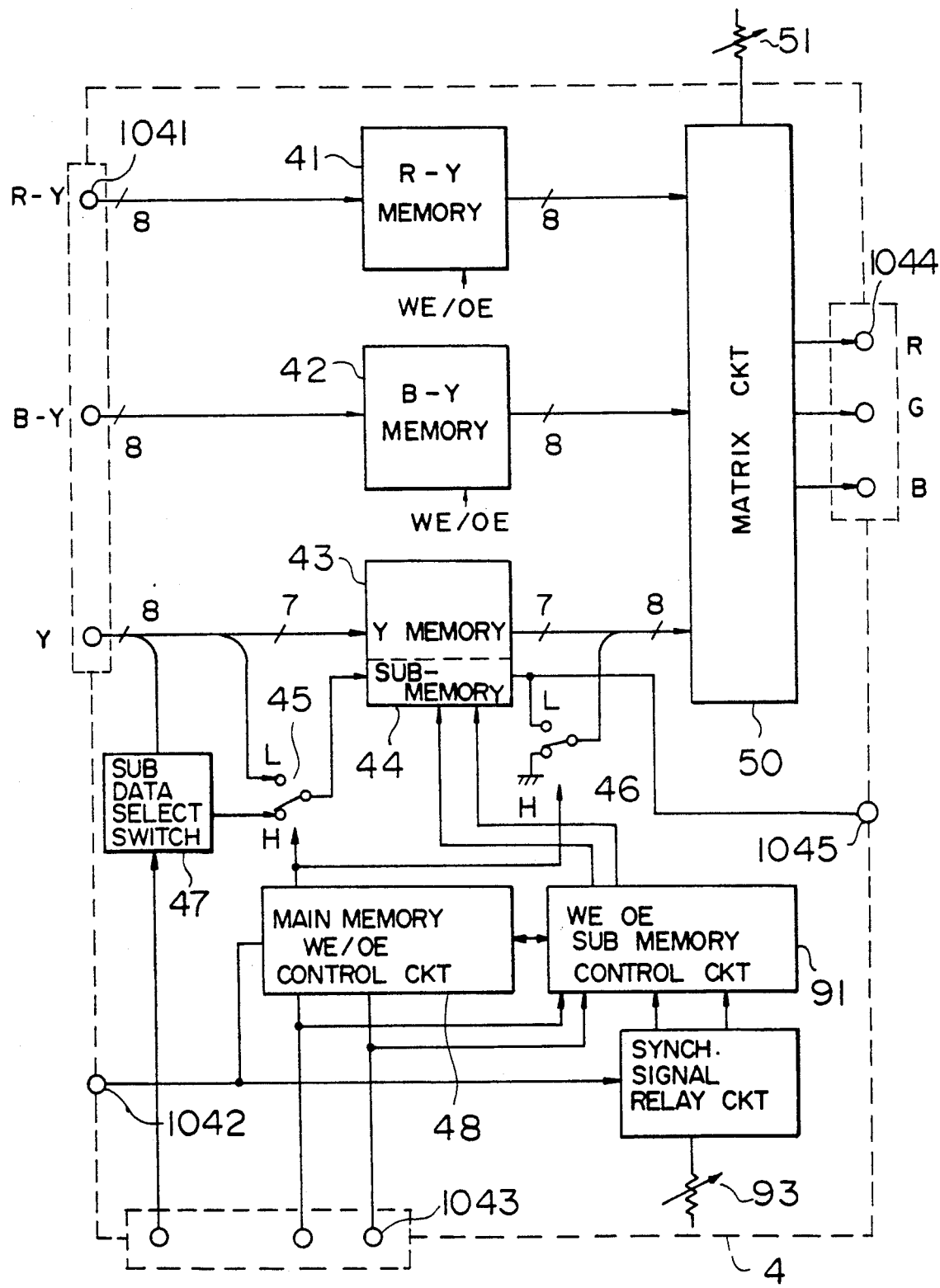
FIG. 20 is a block diagram showing a version of the memory arrangement.

FIG. 20 shows a further embodiment of the video printer according to the invention in which timing for reading the sub-memory shown in FIGS. 5, 9, 10, 15 and 19 is made variable. In FIG. 20, the memory unit including memories 41, 42 and 43 is assumed to be of the same structure as the memory unit 4 shown in FIG. 9 with parts having the same functions as those shown in FIG. 9 being denoted by like reference numerals. Referring to FIG. 20, a numeral 91 denotes a sub-memory control circuit, 92 denotes a synchronizing signal delay circuit and a numeral 93 denotes a position adjusting circuit.

The main memories 41 to 43, the main memory control circuit 48 and the matrix circuit 91 operate similarly to those shown in FIG. 9. The sub-memory control circuit 91 controls write/read operation relative to the sub-memory 44 and operates similarly to the main memory control circuit 48 for the write operation. At that time, the synchronizing signal delay circuit 92 supplies the input synchronizing signal (vertical synchronizing VD or horizontal synchronizing HD signal), as it is, to the sub-memory control circuit 91. On the other hand, upon reading of the sub-memory 44, the synchronizing signal delay circuit 92 operates to vary the phase of the output synchronizing signal relative to that of the, input synchronizing signal. In that case, magnitude of phase displacement of the VD and HD signals is controlled by the position control circuit 93 which controls phases of the VD and HD signals individually and may be constituted by variable resistors or four button switches.

The synchronizing signal delay circuit 92 may be implemented in an analogue configuration (by employing, for example, a mono-stable multi-vibrator) or in a digital configuration (by resorting to, for example, pulse shift by a counter), as is well known in the art. In the analogue type synchronizing delay circuit, the input vertical and horizontal (VD and HD) synchronizing signals are delayed separately and shaped subsequently. In the case of the digital-type delay circuit, the HD signal is delayed by counting a reference clock signal, wherein the count value can be selectively set, for example, by a switch of the position adjusting circuit 93 to thereby determine the amount of the delay. The VD signal can also be delayed and shaped similarly to the HD signal.

As will be apparent from the above, the vertical and-/or horizontal positions of the heart-like graphic pattern and the overlay characters in the synthesized picture shown in FIG. 4, by way of example, can be adjusted by making variable only the phase for reading the sub-memory 44 while confirming the positions on the monitor.

As will now be appreciated from the foregoing description, it is possible to realize overlays in multiplicity without need for increasing the capacity of the main memory, whereby manually prepared picture cards can be manufactured in a facilitated manner. Further, a multiplicity of overlays may be laid on a graphic pattern or the like of half-tone, and colors for the overlays can arbitrarily be selected after the freezing of the synthesized pattern. Thus, it is possible to print the overlays with colors appropriate to the tint or hue of the main picture. Besides, after freezing the overlaid graphics and characters, the overlays can be printed with inverted polarity, i.e. by reversing color to black or vice versa.

What is claimed is:

1. A video printer, comprising:
    main memory means for storing data for a first picture;
    sub-memory means for storing data indicative of an overlay region to be overlaid on the first picture and also indicative of a second picture to be displayed in the overlay region;
    means for determining a condition for display of said overlay region;
    memory data processing means for providing in said overlay region overlay data corresponding to said condition for the display of said overlay region on the basis of the data stored in said sub-memory means by reading out in synchronism data from said main memory means and data stored in said sub-memory means to thereby generate synthesized picture data of said first picture and said second picture to be outputted;
    system control means for controlling the data storage in said main memory means, the data storage in said sub-memory means and operation of said memory data processing means; and
    print means for generating a hard copy on the basis of synthesized picture data output of said memory data processing means.

2. A video printer according to claim 1, wherein said sub-memory means is constituted by a part of said main memory means.

3. A video printer according to claim 1, wherein said main memory means includes R-, G- and B-memories for storing separately red, green and blue chrominance signal components of the first picture signal, said sub-memory means is constituted by a part of at least one of said R-, G- and B-memories.

4. A video printer according to claim 1, wherein said main memory means includes a plurality of main memories for storing separately a plurality of chrominance signals constituting said first picture signal,
    said sub-memory means including a plurality of sub-memories constituted by parts of at least two of said plural main memories, wherein different overlay data are stored in said sub-memories, respectively, and
    said memory data processing means including sub-memory selecting means for determining selectively which of data stored in said plural sub-memories is to be used in preparation of said synthesized picture data.

5. A video printer according to claim 1, wherein means for determining the condition for display of said overlay region designates a color in which said overlay region is to be displayed.

6. A video printer according to claim 1, wherein said memory data processing means selects as the data to be outputted therefrom either the data stored in said main memory means or said synthesized picture data on the basis of the data stored in said sub-memory means.

7. A video printer according to claim 1, wherein said memory data processing means includes means for generating a contour signal indicating a contour of an image to be overlaid from the data stored in said sub-memory means, and contour synthesizing means for synthesizing said contour signal with the data stored in said main memory means.

8. A video printer, comprising:
    main memory means for storing data of a first picture;
    sub-memory means for storing data indicative of an overlay region to be overlaid on the first picture and also indicative of a second picture to be displayed in the overlay region;
    memory data processing means for generating and outputting data for a synthesized picture made up of said first picture of said second picture by reading out in synchronism data in said main memory means and data stored in said sub-memory means on the basis of the data stored in said sub-memory means;
    system control means for controlling the data storage in said main memory means, the data storage in said sub-memory means and operation of said memory data processing means; and
    print means for producing a hard copy on the basis of the output of said memory data processing means.

9. A video printer, comprising:
    main memory means for storing data of a first picture;
    sub-memory means for storing data indicative of an overlay region to be overlaid on the first picture and also indicative of a second picture to be displayed in the overlay region;

memory data processing means for generating and outputting data for a synthesized picture by writing second picture data in said overlay region on the basis of the data stored in said sub-memory means;

means for generating a sub-memory state signal indicating whether or not data is stored in said sub-memory means;

means for allowing a print command to be issued when said sub-memory state signal indicates that data is stored in said sub-memory means and otherwise generating a print disable signal; and print means for producing a hard copy on the basis of the output of said memory data processing means in the presence of said print command.

* * * * *